United States Patent

[11] 3,599,078

[72] Inventors Brian R. Pelly
Murrysville;
Mario G. Tarjan, Pittsburgh, both of, Pa.
[21] Appl. No. 34,805
[22] Filed May 5, 1970
[45] Patented Aug. 10, 1971
[73] Assignee Westinghouse Electric Corporation
Pittsburgh, Pa.

[54] STARTING CIRCUIT FOR PARALLEL TUNED INVERTER
8 Claims, 2 Drawing Figs.
[52] U.S. Cl. .................................... 321/45 S,
321/45 R, 321/45 C
[51] Int. Cl. .................................... H02m 7/52
[50] Field of Search .................... 321/45, 45
C, 45 S; 219/10.77; 331/113.1

[56] References Cited
UNITED STATES PATENTS
| | | | |
|---|---|---|---|
| 3,448,367 | 6/1969 | Corey | 321/45 X |
| 3,475,674 | 10/1969 | Porterfield et al. | 321/45 |
| 3,534,243 | 10/1970 | Kondo et al. | 321/45 |
| 3,506,907 | 4/1970 | Porterfield et al. | 321/45 S |

Primary Examiner—William H. Beha, Jr.
Attorneys—F. H. Henson, C. F. Renz and A. S. Oddi ABSTRACT: An inverter for supplying a parallel tuned load is disclosed including a plurality of controlled switching devices, such as thyristors, a starting circuit and a control circuit for controlling the switching devices and the starting circuit. The inverter is operative to store energy prior to starting, to utilize the stored energy to excite the tune load into oscillation and to operate normally when the oscillations have reached a sufficient magnitude.

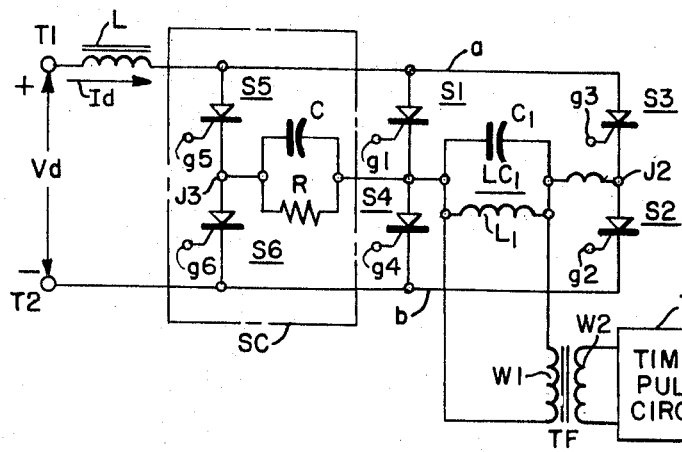
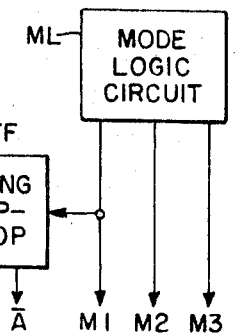
FIG. 1
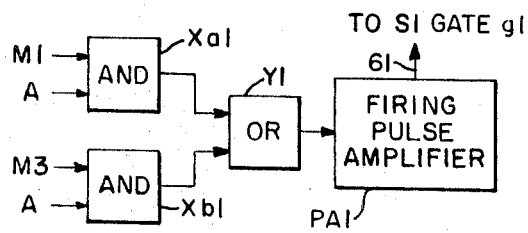
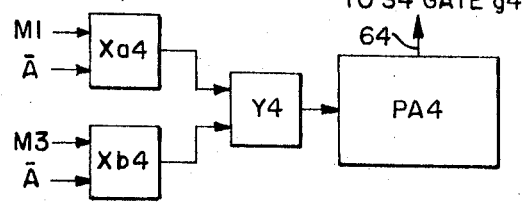
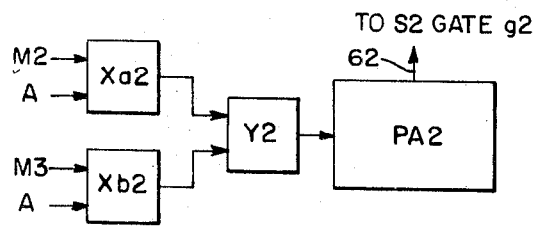
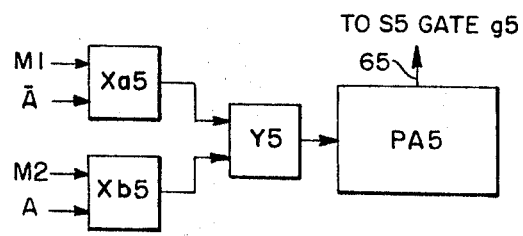
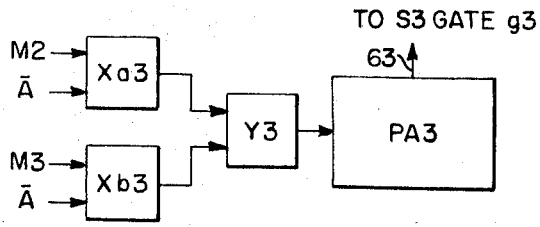
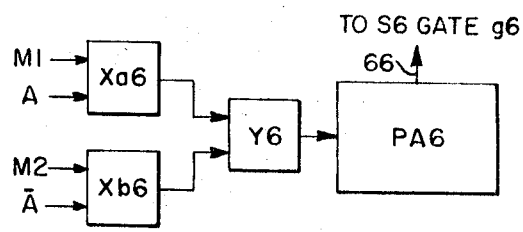

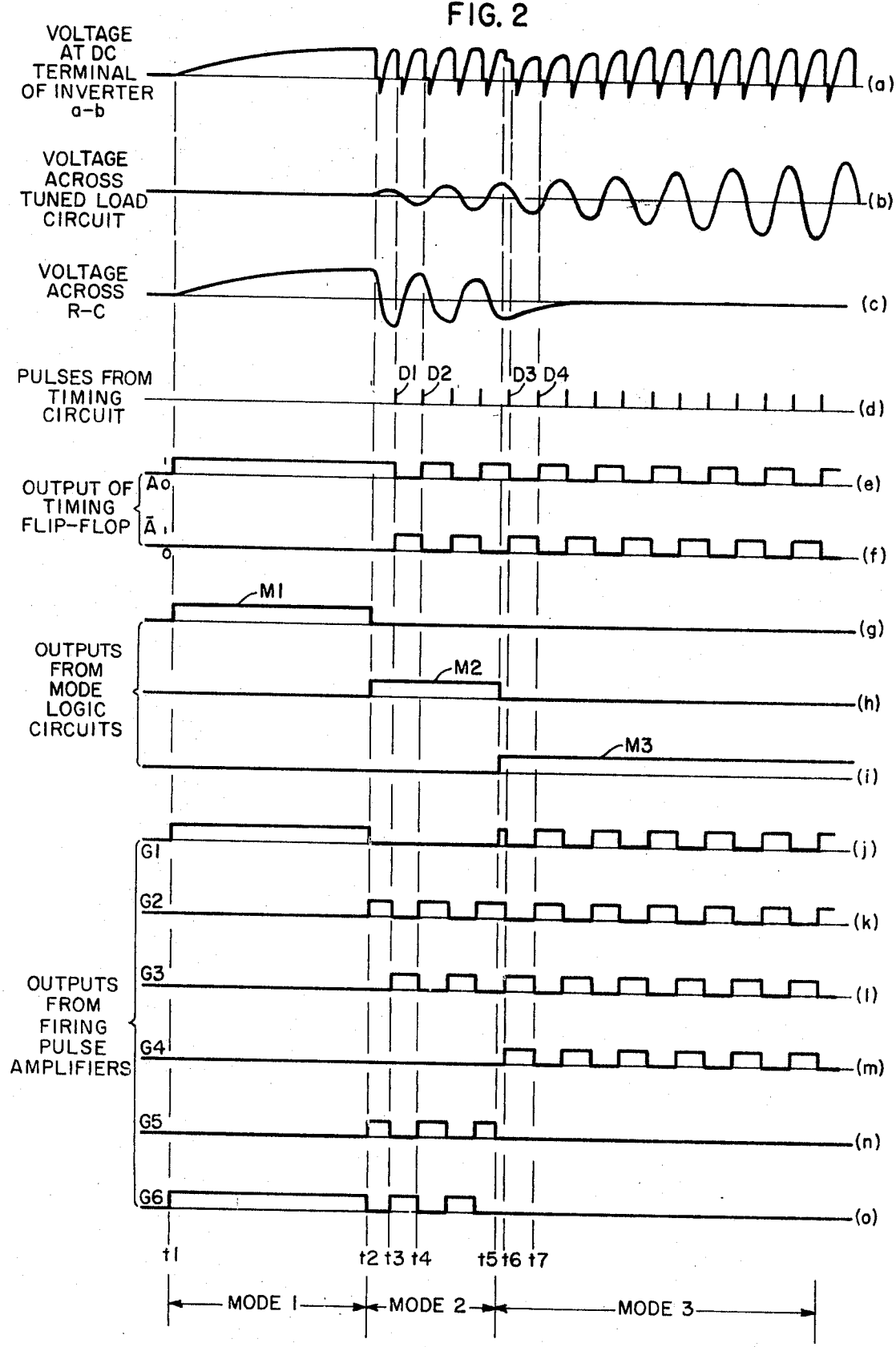

STARTING CIRCUIT FOR PARALLEL TUNED INVERTER

BACKGROUND OF THE INVENTION

1. Field of the Invention

The present invention relates to inverter systems for supplying a parallel tuned load and, more particularly, to such systems including therein a starting circuit.

2. Discussion of the Prior Art

In the past conventional rotating machinery, such as a motor-generator set, has been utilized for supplying the relatively high frequency and power requirements for use in induction heating applications. Recently solid state inverters have been suggested for use as the power supply for induction heating loads, which typically comprise an induction heating coil shunted by a capacitor to form a resonant tuned circuit. In addition to the usual advantages associated with solid state circuitry over rotating machinery, the inverter has the additional advantage of being capable of operating into loads having a wide range of resonant frequencies. For example, a typical range may be from 180 Hz. to 1 kHz. This capability of an inverter makes it particularly attractive as a general purpose variable frequency induction heating power supply. There is, however, one serious disadvantage associated with an inverter power supply for supplying a parallel tuned load, namely, the difficulty of starting the inverter. It is not possible to start up the inverter by merely firing the thyristors in the same manner as under normal operating conditions since there is no energy in the tuned load circuit available for the commutation of the thyristors during the initial startup. It thus becomes essential that some auxiliary means be utilized for starting such a parallel tuned inverter. Moreover, the starting difficulty is compounded in cases where the inverter is required to operate over a wide frequency range into a wide range of loads and where additionally the stray inductance associated with the leads connecting the tuned load to the inverter output is appreciable. These difficulties are such that for over a wide range of load conditions none of the previously known starting techniques are satisfactory.

Among the previously used techniques for starting an inverter of this type are the following: (1) The output tuning capacitor is initially disconnected from the inductance coil by a mechanical switch and is then precharged to a fixed potential from an auxiliary supply. The switch is then closed causing the tuned load circuit to be instigated into oscillation to assist in the starting of the inverter. This technique has the disadvantage of requiring a switch which must be rated to carry full circulating current of the inverter as well as having the usual problems associated with mechanical switches especially of contact bounce. (2) As an alternate technique to precharging the capacitor the work-coil may be energized with a fixed current and then interrupted to induce a burst of oscillation. This method has the practical disadvantage of requiring that the auxiliary starting equipment be placed at the load in order to obviate the difficulties associated with the stray inductance between the inverter and the load. (3) An auxiliary starting circuit may be utilized to charge resonantly the parallel tuned load and thereby build up the oscillations of the load before the inverter is started. The difficulty of this approach is that it is not well adapted to meet a wide range of load conditions making such inverter drives practicable. (4) Another technique is to supply the smoothing inductor, which is normally connected between the input DC supply and the controlled switching devices, with a precharging current which is then diverted through the inverter into the tuned load circuit to shock the load into oscillation. This method has the disadvantage that it may not work if the stray inductance between the inverter and the load exceeds a critical value which may be readily exceeded under practical operating conditions. All of the above techniques have proved less than satisfactory for the dependable starting of an inverter supplying a parallel tuned load wherein wide ranges in the load supplied and frequency of operation are desired and where more than negligible stray inductance is encountered.

SUMMARY OF THE INVENTION

Broadly, the present invention provides an inverter for supplying a parallel tuned load wherein auxiliary starting means and control means are utilized for causing the inverter to be operative in various modes for storing energy therein prior to startup, utilizing this energy for instigating oscillations in the load and placing the inverter in its normal operating mode.

BRIEF DESCRIPTION OF THE DRAWING

FIG. 1 is a schematic-block diagram of the inverter system of the present invention; and FIG. 2 is a waveform diagram including curves (a)—(o) which are utilized in explaining the operation of the system of FIG. 1.

DESCRIPTION OF THE PREFERRED EMBODIMENT

Referring to FIG. 1, the inverter of the present invention is shown being supplied from a DC input voltage $Vd$ applied across a pair of terminals T1 and T2, with the terminal T1 being positive and the terminal T2 negative. A smoothing inductor L is connected between the positive terminal T1 and a top line $a$. The negative terminal T2 is connected to a bottom line $b$. The smoothing inductor L is utilized to smooth the input current, and thereby to act as a "buffer" between the direct current input and the alternating current output. The lines $a$ and $b$ define the top and bottom end of an inverter bridge array comprising a first leg including controlled switching devices S1 and S4 and a second leg including controlled switching devices S3 and S2. The controlled switching devices S1, S2, S3 and S4 may comprise thyristors, silicon controlled rectifiers or other equivalent devices and are selected to have such a power rating as required for the particular inverter application intended. In the bridge array, as shown, the anodes of the devices S1 and S3 are connected to the line $a$, and the cathodes of the devices S4 and S2 are connected to the line $b$. A junction J1 is formed at the cathode-anode junction of the devices S1 and S4, and a junction J2 is formed at the cathode-anode junction of the devices S3 and S2. The junctions J1 and J2 define the output junctions of the inverter from which a parallel tuned load LC, comprising a load inductor $L_1$ and a load tuning capacitor $C_1$ connected directly thereacross is supplied. The inductor $L_1$ may for example comprise the work-coil by use in induction heating and which is adapted to receive a workpiece which is to be inductively heated. The coil $L_1$ and the capacitor $C_1$ together form a tuned circuit which is resonant at a predetermined frequency. This resonant frequency may change by selecting different work coils or different capacitors and, moreover, vary due to changes to inductance of the coil $L_1$ as a workpiece, for example, is heated and passes through its curie point. One end of the tuned load LC is connected to the junction J1, and an inductor Ls is shown connected to the other end of the load LC to the junction point J2. The lumped inductor Ls is intended to represent all the stray inductance of the leads which connect the junction points J1 and J2 to the tuned load LC.

An auxiliary starting circuit is shown enclosed within the dotted box SC and includes an auxiliary pair of controlled switching devices S5 and S6 and the parallel combination of a capacitor C and a resistor R. The anode of the device S5 is connected to the line $a$ and the cathode of the device S6 is connected to the line $b$, with the parallel combination of the capacitor C and resistor R being connected between the junction point J1 of the first leg and a junction point J3 defined between the cathode-anode connection of the devices S5 and S6 of the auxiliary pair. The devices S5 and S6 may comprise thyristors, silicon controlled rectifiers or equivalent devices; however, they may be of a substantially lower power rating than the power devices S1, S2, S3 and S4 since they are utilized only in the starting procedure.

Turning also to FIG. 2 the various modes of operation of the inverter of FIG. 1 will be discussed. Assume that prior to a time $t1$ that the inverter is completely shut down with all the devices S1—S6 being turned off and no current flow or voltages existing in the circuit. For convenience of discussion and as shown in curves (e)—(o) of FIG. 2 binary logic "one" output will be considered as a positive potential and the binary complementary "zero" output thereof will be considered as a zero or ground potential.

MODE 1

The first mode of operation of the inverter is instigated at a time $t1$ by energizing a mode logic circuit ML to provide an output signal M1 as a one output level while the other two outputs of the mode logic circuit ML supply outputs M2 and M3 which are at the zero level. The outputs from the mode logic circuit ML are shown, respectively, in curves (g), (h) and (i) of FIG. 2. It is assumed that the A output of the timing flip-flop is at a one level and the complement thereof $\overline{A}$ is at a zero level at the time $t1$ although, of course, the system operation would be similar if the outputs of the timing flip-flop should happen to be interchanged. The output signals M1 and A are applied to an AND logic gate $Xa1$ and an AND logic gate $Xz6$. In response to the signals M1 and A being at a one level, the AND circuits $Xa1$ and $Xa6$ supply one outputs to OR logic circuits Y1 and Y6, respectively, so that these OR circuits supply a one output to firing pulse amplifiers PA1 and PA6, respectively, In response to the one inputs from the OR circuits Y1 and Y6, the firing pulse amplifiers PA1 and PA6 apply outputs G1 and G6 therefrom which are shown respectively in curves (j) and (o) of FIG. 2. The outputs G1 and G6 are applied, respectively, to the gate electrodes $g1$ and $g6$ of the controlled switching devices S1 and S6 to turn on these devices. A current path is thus provided for the parallel circuit RC comprising the resistor R and the capacitor C with a current $Id$ being supplied from the positive terminal T1 through the smoothing inductor L, the device S1, the RC circuit, the device S6 and the negative terminal T2. The current $Id$ through the smoothing inductor L is thus built up to a value of approximately $Vd/R$, and the capacitor C is charged to the supply voltage $Vd$ with the right hand side thereof being positive. The voltage buildup during the first mode of operation across the lines $a$—$b$ and across the circuit RC are shown, respectively, in curves (a) and (c) of FIG. 2. During mode 1 operation the load voltage is, of course, zero as shown in curve (b).

The first mode of operation of the inverter continues as described above until the noncritical time later in the operation when the inverter is switched to its second mode of operation at the time $t2$.

MODE 2

The second mode of operation is initiated by causing the mode logic circuit ML to supply an M2 output at a one level while M1 and M3 outputs are supplied therefrom at zero output levels. At the time $t2$ the timing flip-flop FF remains in its previous output stage with A at a one value and $\overline{A}$ at a zero value. The one level signals M2 and A are supplied to an AND circuit $Xa2$ and an AND circuit $Xb5$ so that these AND circuits supply one output signals to an OR gate Y2 and an OR gate Y5, respectively. In response to the one inputs thereto, the OR Y2 and Y6 supply one outputs to firing pulse amplifiers PA2 and PA5, respectively, which, in response thereto, supply one output signals at outputs G2 and G5, respectively, which are applied to the gate electrodes $g2$ and $g5$ of the devices S2 and S5 so that these devices are turned on. The gating signals G2 and G5 are shown in curves (k) and (n) of FIG. 2. Since at the time $t2$ the output M1 has reverted to a zero level the AND circuits $Xa1$ and $Xa6$ do not provide a one output to the OR circuits Y1 and Y6 and therefore the gating signals $g1$ and $g6$ are no longer supplied to the devices S1 and S6. Since the capacitor C was charged positively at the junction J1, the device S1 is commutated off immediately with this positive voltage appearing at the cathode thereof. Moreover, because of the positive voltage of the junction J1 from the capacitor C, current is diverted away from the device S6 and through the load circuit LC, and the device S2, so that after a relatively short period of time the device S6 turns off. In response to the current flow into the tuned load $LC_1$, the tuned circuit is shocked into oscillation at its resonant frequency with the voltage developed across the tuned load circuit being shown in curve (b). The oscillation of the tuned load $LC_1$ is sensed by an isolating feedback transformer TF which has a primary winding W1. The secondary winding W2 of the transformer TF is connected as the input to a timing pulse circuit TP. The input to the timing pulse circuit TP is thus the oscillatory waveform appearing across the tuned load as shown in curve (b). The timing pulse circuit TP is responsive to the oscillatory waveform from the tuned load to supply a train of clock pulses D which occur during each half cycle of the oscillatory waveform at a predetermined phase angle before the zero crossing point of the waveform. The clock pulse outputs D of the timing pulse circuit TT are shown in curve D of FIG. 3, and it can be seen that the first pulse D1 occurs at a time $t3$ which is at a predetermined phase angle in the first half cycle of the oscillatory voltage waveform appearing across the tuned load $LC_1$ as shown in curve (b); prior to the time $t3$ there is no input to the timing pulse circuit TT, and it supplies no output pulses therefrom. Circuitry which may be used for the timing pulse circuit TP is fully described in copending applications Ser. No. 705,481, filed Feb. 14, 1968 and Ser. No. 709,634, filed Mar. 1, 1968, both of which are assigned to the same assignee as the present invention.

In response to the first timing pulse D1 from the timing pulse circuit TP being supplied to the timing flip-flop FF, the flip-flop FF switches its output state so that the A output goes to a zero level and the complement thereof $\overline{A}$ goes to a one level. With A at a zero level the AND gates $Xa2$ and $Xb6$ block and no gating pulses are supplied to the devices S2 and S5. However, one inputs are supplied to the AND gates $Xa3$ and $Xb6$ in that both M2 and $\overline{A}$ had one levels at the time $t3$. Thus one output signals are supplied via the OR circuits Y3, Y6 to the firing pulse amplifiers Pa3 and Pa6 which cause gating signals to be applied to the gate electrodes $g3$ and $g6$ of the devices S3 and S6 to turn on these devices. These gating pulses are shown in curves (l) and (o) of FIG. 2. During the time period $t2$—$t3$, the capacitor C has charged in the opposite direction so that its left side at the junction J3 was charged positively as can be seen in curve (c) of FIG. 2. Therefore, the controlled switching device S5 and the device S2 are commutated off by a reverse bias supplied from the capacitor C. The devices S5 and S2 are turned off in the relatively short time necessary for the reversal of the current $Id$ in the stray inductor $Ls$.

The next clock pulse D2 (curve d) from the timing pulse circuit TP is supplied at a time $t4$ in response to the voltage across the tuned load $LC_1$, as shown in curve (b), reaching a predetermined phase angle in its negative half cycle at the time $t4$. In response to pulse D2 the timing flip-flop FF reverts to the output state with A at a one output level and $\overline{A}$ at a zero output level. Therefore gating pulses are removed from the devices S3 and S6 and devices S5 and S2 have gating pulses applied thereto as shown in curves (k) and (n) OF FIG. 2. The capacitor C having reversed its polarity at the time $t4$ commutates off the devices S3 and S6 and the direction of current supplied to the tuned load circuit $LC_1$ is reversed.

The operation in the second mode continues as described with the devices S3 and S6 being turned on and then commutated off as the devices S2 and S5 are turned on and are then commutated off as the devices S3 and S6 are turned on to start the next half cycle of operation. In such fashion the oscillatory voltage across the tuned load is built up over a number of half cycles as shown in curve (b). The inverter is operated in mode 2 for a predetermined period of time until the amplitude of the voltage oscillation across the load $LC_1$ in relation to the direct current flowing in the inverter is sufficient to insure reliable self commutation of the power devices S1—S2 and S3—S4 by the voltage across the load capacitor $C_1$ without the assistance of the capacitor C of the starting circuit.

MODE 3

After a number of half cycles the oscillation of the tuned load circuit LC₁ has reached sufficient amplitude for the inverter to be switched to its normal mode of operation. This is effected by setting the mode logic circuit ML to provide a one output M3 and zero outputs M1 and M2. In FIG. 2 this is done at a time t5 where immediately prior to t5 devices S2 and S5 are in the conductive state and the output A of the timed flip-flop FF1 is in a one output state. In response to the one outputs at A and M3, AND circuits Xb1 and Xb2 supply one outputs to OR circuits Y1 and Y2, respectively. The one outputs of the OR circuits Y1 and Y2 cause firing pulse amplifiers PA1 and PA2 to supply gating pulses to the gate electrodes g1 and g2 of the controlled switching devices S1 and S2, respectively. The device S1 is thus turned on in response to the gating signal thereto, and the device S2 previously turned on remained in its turned on state. Since the capacitor C has been charged positive on its left side, the previously conductive device S5 prior to the time t5 will be commutated off thereby deactivating the start circuit from the inverter operation in that device S6 was previously turned off. Any charge on the capacitor C is dissipated through the resistor R as shown in curve (c) of FIG. 2 with this capacitor being uncharged during the normal operation of the inverter.

At a time t6 a clock pulse D3 is supplied from the timing pulse circuit TP in response to the voltage across the tuned load as shown in curve (b) reaching the predetermined phase angle in its half cycle. In response to the clock pulse D3, the timing flip-flop FF goes to the output state with A at a zero level and $\bar{A}$ at a one level. Therefore at the time t6 one signals from M3 and $\bar{A}$ are applied to AND circuits Xb3 and Xb4 which supply one outputs, respectively, to the OR circuits Y3 and Y4, which in turn supply one outputs to the firing pulse amplifiers PA3 and PA4. Gating signals G3 and G4 are therefore applied to the gate electrodes g3 and g4 of the power switching devices S3 and S4 as shown in curves (l) and (m) of FIG. 2 to turn on these devices at the time t6. Since the devices S1 and S2 have been previously conductive, the load capacitor C₁ has charged with its left side positive, so with the turning on of the devices S3 and S4 the devices S1 and S2 are commutated off and the current Id is reversed through the tuned load LC₁.

At the time t7 a clock pulse D4 causes the timing flip-flop FF to change its output states with A at a one level and $\bar{A}$ at a zero level. In response to A and M3, the AND circuits Xb1 and Xb2 are activated so that gating pulses G1 and G2 are supplied to the devices S1 and S2 and the gating signals are not supplied to the devices S3 and S4, with the devices S3 and S4 being commutated off by the reverse bias supplied thereto from the load capacitor C₁. The inverter now continues to operate in this mode with the devices S1—S2 being alternately turned on and commutated off as the devices S3 and S4 are turned on and then commutated off. The oscillatory voltage across the tuned load builds up to a steady state value as shown in curve (b) and provides a sinusoidal output which may be ideally used in industrial heating applications.

If the resonant frequency of the tuned load circuit should change, the frequency of the load voltage also would change, since the timing pulse circuit TP generates the clock pulses D at a fixed phase angle with respect to each half cycle of oscillation. The repetition rate of the clock pulses D will so be adjusted in response to the change in output frequency that the timing flip-flop FF will supply the outputs A and $\bar{A}$ in accordance therewith which will control the various logic elements in accordance with the new changed resonant frequency. Accordingly, the inverter system as shown in FIG. 1 is operative over a wide range of frequencies and over a wide range of tuned loads.

It should be understood that in mode 1 the devices S4 and S5 could be gated on to energize the RC circuit rather than the devices S1 and S6 as described above. If this were the case at the initiation of mode 2 of operation, the devices S3 and S6 would be turned on to initiate the second mode of operation rather than the devices S2 and S5 as is the case when the devices S1 and S6 are turned on in mode 1. The inputs to the logic circuits would be accordingly modified in order to accommodate this change.

Although the present invention has been described with a certain degree of particularity, it should be understood that the present disclosure has been made only by way of example and that numerous changes in the details of fabrication and the combination and arrangement of parts, elements and components can be resorted to without departing from the spirit and the scope of the present invention.

I claim as my invention:

1. In an inverter for supplying energy to a parallel tuned load comprising a plurality of controlled switching devices connected in a bridge array including a first and a second leg with at least a pair of said devices connected in each leg and said load being connected between said legs, the combination of:
   1. starting circuit means including
      a. an auxiliary pair of controlled switching devices operatively connected across said bridge array and
      b. RC circuit means operatively connected between said auxiliary pair of devices and said first leg;
   2. mode selection means for providing mode signals to establish various modes of operation of said inverter;
   3. sensing means for providing sensed signals in response to the energization of said load; and
   4. logic circuit means responsive to said mode and said sensed signals for controlling the operation of said inverter so that
      a. in a first mode only said RC circuit means is energized,
      b. in a second mode said tuned load is instigated into oscillation by energy stored during said first mode of operation, and
      c. in a third mode energy is supplied to said load via said first and second legs and said starting circuit means is deactivated.

2. The combination of claim 1 wherein:
said logic circuit means providing gating signals to said controlled switching devices of said bridge array and said starting circuit means for turning on the respective of said devices in a predetermined relationship in response to said mode and sensed signals so that
   a. in said first mode one of said devices in said first leg and in said auxiliary pair being turned on to energize said RC circuit means,
   b. in said second mode one of said devices in said second leg and in said auxiliary pair being alternately turned on and commutated off in response to energy in said starting circuit means, and
   c. in said third mode one of said devices in said first and second legs being alternately turned on and commutated off in response to energy in said tuned load.

3. The combination of claim 2 wherein:
said RC circuit means comprising the parallel combination of a capacitor and a resistor operatively connected between said auxiliary pair of devices and said first leg of said bridge array.

4. The combination of claim 3 wherein:
said sensing means operatively connected across said tuned load and responsive thereto to provide an output for generating said sensed signals in response thereto when the oscillation of said tuned load reaches a predetermined phase angle.

5. The combination of claim 4 wherein:
said sensed signals having a primary state A and a complementary state $\bar{A}$,
said mode signals comprising signals M1, M2 and M3 which have a primary state or a complementary state when one of said signals M1, M2, or M3 is at a primary state the other two are at a complementary,
said first, second or third modes of operation of said inverter being established by said primary states of said signals M1, M2 or M3, respectively.

6. The combination of claim 5 wherein:
said first leg includes first and fourth of said devices, said second leg includes third and fourth of said devices and said auxiliary pair includes fifth and sixth of said devices,
 a. in said first mode said first and sixth devices or said fourth and fifth devices being turned on and all other devices being turned off,
 b. in said second mode said second and fifth devices and said third and sixth devices being alternately turned on and said first and fourth devices being turned off, and
 c. in said third mode said first and second devices and said third and fourth devices being alternately turned on and said fifth and sixth devices being turned off.

7. The combination of claim 6 wherein:
said logic circuit means includes a plurality of logic gates, respective of said logic gates responsive to said signals A, $\bar{A}$, M1, M2 and M3, for supplying said gating signals to the respective of said plurality of devices.

8. The combination of claim 1 wherein:
said controlled switching devices of said auxiliary pair of devices are of a substantially lower power rating than said devices of said first and second legs of said bridge array.